No. 634,861. Patented Oct. 17, 1899.
A. J. AVERY.
TEA OR COFFEE POT.
(Application filed July 13, 1899.)
(No Model.)
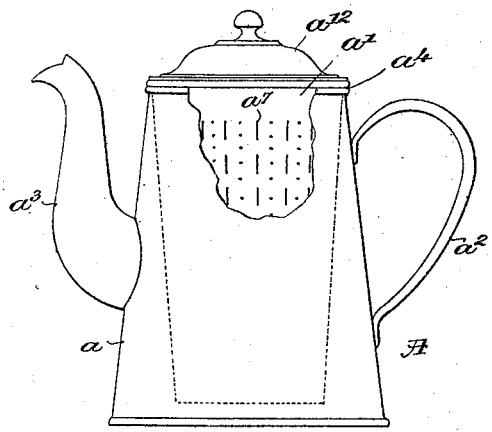
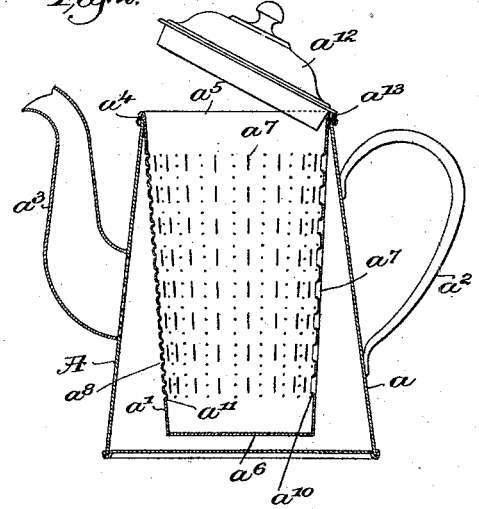
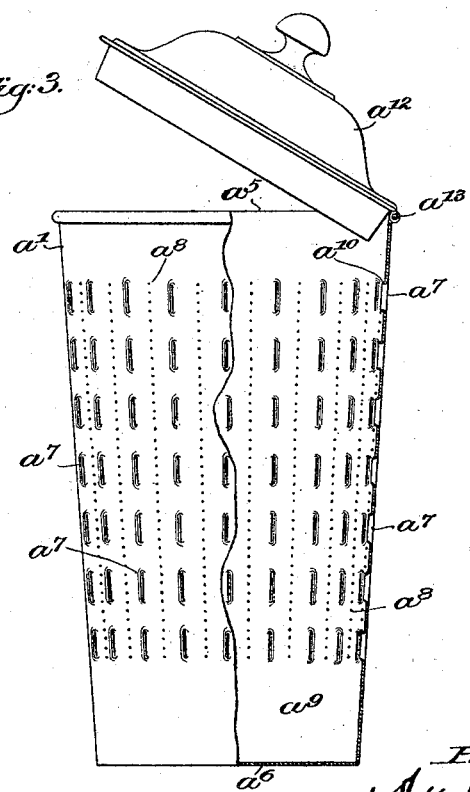
THE NORRIS PETERS CO., PHOTO-LITHO., WASHINGTON, D. C.

UNITED STATES PATENT OFFICE.

ANDREW J. AVERY, OF PITTSFIELD, NEW HAMPSHIRE.

TEA OR COFFEE POT.

SPECIFICATION forming part of Letters Patent No. 634,861, dated October 17, 1899.

Application filed July 13, 1899. Serial No. 723,680. (No model.)

*To all whom it may concern:*

Be it known that I, ANDREW J. AVERY, a citizen of the United States, residing at Pittsfield, in the county of Merrimac and State of New Hampshire, have invented certain new and useful Improvements in Tea or Coffee Pots; and I do hereby declare the following to be a full, clear, and exact description of the invention, such as will enable others skilled in the art to which it appertains to make and use the same.

The present invention relates to cooking utensils, and more particularly to a pot or boiler used in making tea or coffee.

The object of the present invention is to produce a coffee or tea pot so constructed and arranged that the full strength of the coffee or tea will be extracted and from which the decoction may be poured perfectly clear and free from grounds or other objectionable sediment.

To the above end the present invention consists of the devices and combination of devices, which will be hereinafter described and claimed.

The present invention is illustrated in the accompanying drawings, in which—

Figure 1 shows a side elevation of a tea or coffee pot embodying the same with the outer receptacle broken away for the purpose of showing the construction and arrangement of the inner receptacle. Fig. 2 shows a vertical sectional view; and Fig. 3 shows, enlarged, a side elevation and partial section of the inner receptacle, illustrating the formation of the apertures therein.

Similar reference characters will be used to designate corresponding parts throughout the specification and drawings.

In the drawings, A represents the improved coffee or tea pot, comprising an outer receptacle $a$ and an inner receptacle $a'$. The outer receptacle or pot A may be of any usual or preferred form of coffee or tea pot constructed of any preferred material, such as sheet metal, and provided with the usual handle $a^2$ and spout $a^3$ and preferably constructed so as to taper from the bottom to the top, as indicated, the top being open, as at $a^4$. The inner receptacle $a'$ is constructed of any suitable material, preferably of sheet metal, and is preferably tapered in a direction opposite to the taper of the outer receptacle $a$. The receptacle $a'$ is open at its upper end, as shown at $a^5$, and has a closed bottom $a^6$, and is of a length to extend downward in the receptacle $a$ nearly to the base of such receptacle when it is placed therein, as indicated at Figs. 1 and 2. The tapered wall of the receptacle $a'$ is provided with apertures, preferably formed of vertically-extending rows of slots $a^7$ and rows of holes $a^8$, the rows of slots and holes being preferably alternately arranged, as shown in the drawings. The rows of slots and holes $a^7$ and $a^8$ extend from a point near the top of the receptacle $a'$ to a point near the bottom thereof, leaving at the base of the receptacle an imperforate cup or chamber $a^9$. The slots $a^7$ and holes $a^8$ are formed by suitably-shaped punches and are punched in said receptacle from the outer to the inner side, thereby forming on the inside of such receptacle raised ribs and projections, as indicated at $a^{10}$ and $a^{11}$. At the top or apexes of such projections will appear the slots or openings into the interior of the receptacle.

By forming the apertures in the receptacle $a'$ in the manner indicated, with the projections surrounding the openings, such projections form guards, as it were, around the apertures, and while permitting a free flow of the coffee or tea decoction from such receptacle they effectually prevent the passage of the coffee-grounds or tea-dust from such receptacle into the receptacle or pot $a$. Thus the tea or coffee which is being prepared may be poured from the receptacle or pot $a$ clear and free from all objectionable sediment.

The receptacle $a'$ is provided with a suitable top or cover $a^{12}$, which is preferably hinged thereto at $a^{13}$, and when closed, as shown in Fig. 1, imparts to the coffee-pot the appearance of the well-known and usual form of such device.

In the use of the device the coffee or tea will be placed in the receptacle $a'$ and received in the imperforate chamber $a^9$, and thereupon boiling water will be poured into the receptacle on the tea or coffee therein and will flow freely through the apertures in said receptacle into the pot or outer receptacle $a$.

It will be noted that by extending the receptacle $a'$ downward to a point near the bottom of the pot A the coffee or tea will be submerged in the water contained in the pot A, and thus the full strength of the tea or coffee will be extracted without liability of the grounds passing through the receptacle $a'$ into the pot $a$.

I am aware that various devices have been used in an attempt to secure the results secured by my device—such as textile bags suspended in the coffee-pot or by the use of wire-gauze devices—but such devices have been objectionable by reason of the clogging of the coffee or tea therein, preventing the free passage of the decoction into the pot, or such devices have been found to be objectionable in that in a greater or less degree grounds or sediment will be found to pass from such receptacle into the pot and will be poured off with the decoction. The formation of the apertures with their surrounding inward projections, as illustrated in the present invention, effectually obviates this difficulty.

Having described the form and arrangement of my invention and the manner of using the same, I claim as new and desire to secure by Letters Patent of the United States—

In a coffee or tea pot, the combination with an outer receptacle, of an inner receptacle, such inner receptacle being provided with apertures or slots, and raised bosses or projections on its inner surface surrounding such apertures or slots, substantially as described.

In testimony whereof I affix my signature in presence of two witnesses.

ANDREW J. AVERY.

Witnesses:
CELIC L. AVERY,
HORACE VAN EVEREN.